March 29, 1932. C. MAYER 1,851,199
STAND FOR LAMPS
Filed June 4, 1929
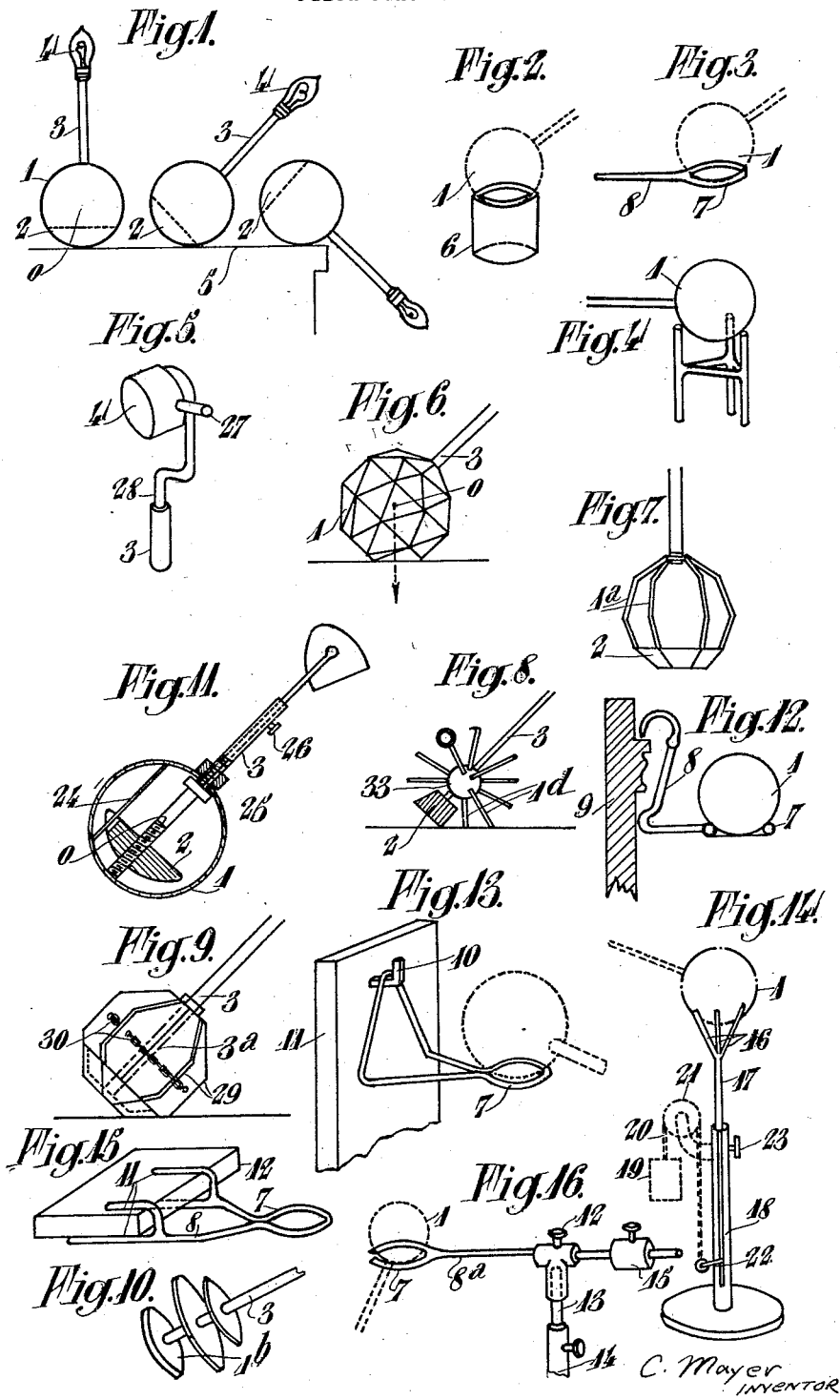

Patented Mar. 29, 1932

1,851,199

UNITED STATES PATENT OFFICE

CHARLES MAYER, OF PARIS, FRANCE

STAND FOR LAMPS

Application filed June 4, 1929, Serial No. 368,265, and in France June 9, 1928.

The present invention has for object a stand more particularly adapted to be used as support, capable of being orientated, for lamps, and particularly for electric lamps, but capable, however, of receiving other applications.

Such a stand comprises a steadying-pedestal and an arm to which the lamp or lamps are secured, and it allows of placing this latter in equilibrium in a practically illimited number of positions about a theoretical point chosen on the pedestal.

For that purpose, the stand is characterized in that the steadying pedestal is constituted by the distribution, about a theoretical point constituted by the center of gravity of the pedestal and lamp combined, of material points, lines, or surfaces, or of the combination of these elements, so that it can rest in indifferent equilibrium on a bearing with which it comes in contact through punctiform, linear or areolar supporting bases.

Such as defined in its principle, the invention lends itself to various forms of construction which may differ from each other particularly:

1. By the nature and the shape of the means connecting together the material bearing points, lines or surfaces of the pedestal.
2. By the method of connection adopted between the pedestal and the lamp or lamps to be supported.
3. By the presence or absence of means allowing to vary the position of the center of gravity of the structure constituted by the stand and the lamp or lamps.
4. By the combination with the stand proper, of devices such as brackets, columns or the like provided with bearing points for the pedestal.

A form of construction of the invention which is convenient owing to its simplicity and to the decorative effects which can be obtained, is characterized in that the pedestal of the stand is constituted by a hollow sphere or a hollow body which can be inscribed in a sphere and within which is arranged a mass of dense material the position of which can be adjusted relatively to the center of the sphere, so as to cause to coincide, with this center, the center of gravity of the structure constituted by the stand and the lamp or lamps it carries.

The accompanying drawings diagrammatically illustrate, by way of example only, various forms of carrying out the features defining the invention.

Figure 1 shows a first form of carrying out the invention.

Figures 2, 3 and 4 show the stand of Fig. 1 combined with various devices for supporting the pedestal.

Figure 5 shows, in perspective, the upper part of a lamp-carrying arm.

Figure 6 shows a pedestal constituted by a solid having plane faces and which can be inscribed in a sphere.

Figures 7 to 10 illustrate constructional modifications of a pedestal.

Figure 11 is an axial section of a stand having a hollow spherical pedestal and the position of the center of gravity of which is adjustable.

Figures 12 to 16 illustrate forms of construction of devices for supporting the pedestal of the stand.

As already indicated, the stand forming the subject-matter of the invention comprises a pedestal constituted by the distribution of material points, lines or surfaces, or of these elements combined together in any manner whatever, about the center of gravity of the whole structure constituted by the pedestal and all its elements, and by one or more arms secured to this pedestal as well as the lamp or lamps carried by these arms.

In the example illustrated in Fig. 1, the pedestal is constituted by a hollow sphere 1, made of any suitable material (wood, cork, moulded cardboard, glass, metal, etc) internally provided with a mass of dense material 2 and, externally, with a rod 3, the free end of which is adapted to receive an electric lamp 4.

The mass 2 is so chosen and arranged that the center of gravity of the whole structure constituted by the stand and the lamp passes through the center 0 of the sphere. The latter, placed on a plane surface (table 5 for instance) is, from this fact, in indifferent equilibrium, and the lamp 4 can be brought and naturally held in all desired positions.

In the example of Fig. 1, the bearing base of the pedestal or sphere is punctiform. It can be linear and constituted by a small circle of the sphere if the latter rests on a support such as a hollow cylinder 6 (Fig. 2) or a ring 7 provided at the end of a bracket (Figs. 3 and 12). In Fig. 12 the bracket is such that it can be hooked to the cornice of a wall 9 or to the moulding of a piece of furniture and be held thereon by the own weight of the whole structure.

Figure 12 shows a bracket 8 provided with a ring 7 and which is hooked on a nail 10 on a vertical wall 9; Fig. 15 illustrates a bracket of the same kind provided with branches 11 allowing to secure it on a horizontal wall and, for instance, on the edge of a table or shelf 12.

The supporting closed or opened ring 7 can also be formed at the end of a rod 8ª movable in a horizontal slide 12 secured at the end of a sliding rod 13 adjustable in height relatively to a stand 14 or pedestal of any desired arrangement. In this case, a rider acting at the same time as a counterweight 15 is conveniently provided on the rod 8ª for ensuring the stability of the support for any position of the pedestal 1 and of its lamp. The supporting base can also be constituted by several points and preferably, by three points (case of the special tripod of Fig. 4 or of the support with divergent rods of Fig. 14). In the example of Fig. 14, the spherical pedestal 1 rests on the ends of three divergent rods 16, the root of which is on a vertical rod 17 adjustable in height relatively to a hollow column 18 and balanced as well as the load it supports by a counterweight 19. The latter is hung from a supple bond 20 passing over a pulley 21 and is attached to a fork piece or to a finger 22 integral with the rod 17 which latter can moreover be locked in the position chosen by a screw 23.

A particularly convenient form of construction is illustrated in Fig. 11.

In this form of construction, the mass of dense material 2 is adjustable in position relatively to the center of the sphere 1, so as to allow of always bringing back to this point the center of gravity of the entire stand.

For that purpose, the mass 2 constitutes a nut screwed on the rod 3 immobilized in translation relatively to the sphere 1. The nut is angularly immobilized by a rod 24 rigidly secured to the sphere 1 and along which rod 24 it is slidable. By turning the lamp-carrying rod 3, the position of the mass 2 is modified relatively to the center 0. When the conditions of indifferent equilibrium are fulfilled, the rod 3 is locked by tightening a nut 25 arranged outside the sphere, or by any equivalent means. The rod 3 can be made in two or more parts telescopically mounted and provided with locking means such as a screw 26. Whatever may be the weight of the lamp and of its reflector and whatever may be the total development of the rod 3, it is always possible to obtain the indifferent equilibrium which constitutes the remarkable particularity common to all the forms of construction of the invention.

Besides the orientation of the lamp obtained by the position of the pedestal 1, supplementary freedom of movement of the lamp 4 can be obtained, by mounting the latter, and its reflector if need be, on a pivoting axis 27 which can be orientated about an axis 28 perpendicular thereto and which axis 28 is the same as that of the rod 3 (Fig. 5).

Figure 6 shows a pedestal constituted by a hollow body 1, having plane external faces and all the apices of which are preferably on one and the same spherical surface having 0 for center. In this case, the pedestal 1 rests by one of its faces on a table, or by its edge on supports of the kind described in the foregoing.

Figure 9 shows a pedestal composed of rigid panels 29, made of any suitable materials (glass, cardboard or the like), which can be pivoted on an axis 3 and can be folded up for transport. In this case, the pedestal rests on a table through the edges of the panels 29, the spacing apart of which is limited by stay members or small chains 30. These panels can be decorated and, if they are made of glass, they can be lighted edgewise by means of a lamp arranged according to the axis 3ª.

In Figure 7 the sphere 1 is replaced by wires 1ª connected to a dense mass 2, and in the example of Fig. 10, the sphere is replaced by an equatorial circle and parallels 1ᵇ secured on the rod 3.

In Figure 8, the sphere is replaced by points which are constituted by the ends of rods 1ᵈ secured, as well as the lamp-carrying rod 3, to a central core 33 carrying a mass 2.

Still further examples of construction of the invention might be given. The said invention extends to all constructional modifications which do not alter in any way the principle of utilization and the object sought for as above mentioned. Generally speaking, the forms, materials and dimensions, the accessories and applications can vary according to circumstances without departing from the scope of the invention.

What I claim as my invention and desire to secure by Letters Patent is:—

In a stand for lamps, a hollow spherical base, means secured to the said base for receiving a lamp with accessories attached thereto, a threaded rod passing through the hollow spherical base, a nut of a dense material screwed upon the said rod, means to prevent the said nut from rotating, in order to put, by rotating the rod, the centre of gravity of the whole into coincidence with the centre of the spherical base.

In testimony whereof I have signed this specification.

CHARLES MAYER.